(12) United States Patent
Wei et al.

(10) Patent No.: US 10,924,248 B2
(45) Date of Patent: Feb. 16, 2021

(54) SIGNAL-TO-NOISE RATIO DETERMINING METHOD AND DEVICE, AND CHANNEL EQUALIZATION METHOD AND DEVICE

(71) Applicant: NATIONAL UNIVERSITY OF DEFENSE TECHNOLOGY, Hunan (CN)

(72) Inventors: Jibo Wei, Hunan (CN); Fanglin Gu, Hunan (CN); Shengchun Huang, Hunan (CN); Jun Xiong, Hunan (CN); Qi Tang, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 0 days.

(21) Appl. No.: 16/614,353

(22) PCT Filed: Aug. 23, 2018

(86) PCT No.: PCT/CN2018/101903
§ 371 (c)(1),
(2) Date: Nov. 16, 2019

(87) PCT Pub. No.: WO2020/000613
PCT Pub. Date: Jan. 2, 2020

(65) Prior Publication Data
US 2020/0412499 A1 Dec. 31, 2020

(30) Foreign Application Priority Data
Jun. 26, 2018 (CN) .......................... 201810670194.4

(51) Int. Cl.
| H04L 5/00 | (2006.01) |
| H04L 1/00 | (2006.01) |
| G06K 9/62 | (2006.01) |
| H04B 1/7105 | (2011.01) |
(Continued)

(52) U.S. Cl.
CPC ............ *H04L 5/006* (2013.01); *G06K 9/6256* (2013.01); *H04B 1/71055* (2013.01);
(Continued)

(58) Field of Classification Search
CPC ..... H04L 5/0048; H04L 5/006; H04L 1/0002; H04L 5/005; H04L 25/03156; H04B 17/336; H04B 1/71055; G06K 9/6256
See application file for complete search history.

(56) References Cited

U.S. PATENT DOCUMENTS

2008/0240307 A1* 10/2008 Wang ................ H04L 25/03159
375/343
2014/0307641 A1* 10/2014 Shen .................... H04B 17/345
370/329

(Continued)

FOREIGN PATENT DOCUMENTS

| CN | 101572682 A | 11/2009 |
| CN | 102035765 A | 4/2011 |
| CN | 104022980 A | 9/2014 |

OTHER PUBLICATIONS

International Search Report for PCT/CN2018/101903 dated Mar. 27, 2019, ISA/CN.
(Continued)

*Primary Examiner* — Sung S Ahn
(74) *Attorney, Agent, or Firm* — Yue (Robert) Xu; Apex Attorneys at Law, LLP

(57) ABSTRACT

There are provided a signal-to-noise ratio determining method and device for a receiving end of an information transmission system, and a channel equalization method and device based on a minimum mean square error (MMSE) equalizer. The signal-to-noise ratio determining method and device are based on an information transmission system in which timing synchronization is achieved by using a structure of a repetitive training sequence. The signal-to-noise
(Continued)

ratio determining method includes: acquiring a peak and a valley of an autocorrelation function, where the peak represents a sum of a signal average power and a noise average power, and the valley represents the noise average power; and determining a signal-to-noise ratio based on the peak and the valley.

18 Claims, 10 Drawing Sheets

(51) Int. Cl.
  *H04B 17/336* (2015.01)
  *H04L 25/03* (2006.01)
(52) U.S. Cl.
  CPC ......... *H04B 17/336* (2015.01); *H04L 1/0002* (2013.01); *H04L 5/0005* (2013.01); *H04L 25/03159* (2013.01)

(56) References Cited

U.S. PATENT DOCUMENTS

2015/0236848 A1  8/2015  Ma et al.
2016/0291163 A1  10/2016  Wallace
2017/0019287 A1  1/2017  Yang et al.

OTHER PUBLICATIONS

CNIPA First Office Action corresponding to Application No. 201810670194.4; dated Jul. 4, 2019.
Li, Yongyin, et al. Method for SNR Estimation Based on Autocorrelation Function, Jornal of Military Communications Technology, Jun. 30, 2011(Jun. 30, 2011), pp. 19-21, vol. 32 No. 2.

* cited by examiner

US 10,924,248 B2

SIGNAL-TO-NOISE RATIO DETERMINING METHOD AND DEVICE, AND CHANNEL EQUALIZATION METHOD AND DEVICE

The present application is the national phase of PCT International Patent Application PCT/CN2018/101903, filed on Aug. 23, 2018, which claims priority to Chinese Patent Application No. 201810670194.4, titled "SIGNAL-TO-NOISE RATIO DETERMINING METHOD AND DEVICE, AND CHANNEL EQUALIZATION METHOD AND DEVICE", filed on Jun. 26, 2018 with the Chinese Patent Office, both of which are incorporated herein by reference in their entireties.

FIELD

The present disclosure relates to the technical field of mobile communication systems, and in particular to a signal-to-noise ratio determining method and device for a receiving end of an information transmission system, and a channel equalization method and device based on an MMSE equalizer.

BACKGROUND

For an information transmission system with a high transmission rate, a multi-carrier transmission technology or a single-carrier transmission technology may be adopted for transmission. The orthogonal frequency division multiplexing (OFDM) technology is a representative multi-carrier transmission technology. The single carrier frequency domain equalization (SCFDE) technology is a representative single-carrier transmission technology. The following description is given by taking an SCFDE system as an example. Reference is made to FIG. 1, which is a schematic diagram showing a transmission process of an SCFDE system in the conventional technology. The transmission process is described below. At the transmitting end, channel coding is performed on a binary bit stream, then constellation mapping is performed, and a guard interval (GI) is inserted in the signal, where a cyclic prefix (CP) or a unique word (UW) is generally used as a GI in the SCFDE system. Then shaping filtering, up-conversion (DUC), and digital-to-analog conversion (D/A) are performed on the signal, and then the processed signal enters a channel. At the receiving end, an inverse process of the transmitting-end process is performed. The analog-to-digital conversion (A/D), down-conversion (DDC), matched filtering are performed on the signal, and then timing synchronization and frequency synchronization are performed on the system. Then the guard interval is removed. In this case, the signal is divided into two parts including a pilot part and a data part. The pilot part is mainly used for channel estimation. The data part is converted to the frequency domain through the FFT transform, and then the converted data together with a channel response and a signal-to-noise ratio obtained by the pilot part is used for MMSE frequency domain equalization. The FFT transform is performed to convert the signal to the time domain. Then decision and decoding are performed on the converted signal to obtain the original binary bit stream.

In the SCFDE system, a minimum mean square error (MMSE) equalization method is used for the channel equalization, in which an MMSE equalizer is adopted. In this case, the effects of both a noise and a channel are taken into consideration, so that the effect of the noise on the system does not increase in a case that there is deep fading on the transmission channel. The basic operation principle of the MMSE equalizer is described below. An equalizer coefficient is calculated to minimize a mean square of a difference between an equalizer output and an expected signal, which requires to accurately estimate the signal-to-noise ratio. There are two common signal-to-noise ratio estimation methods, i.e., a data-aided estimation method and a blind estimation method. The data-aided estimation method is adopted by most existing systems. Most typically, the Boumard algorithm is generally adopted, in which the noise power is estimated by using two preamble symbols. The calculation complexity of this method is large. Further, it is required to further estimate the signal-to-noise ratio based on the estimated noise power.

Therefore, a technical problem to be solved by those skilled in the art is to reduce the calculation amount for the signal-to-noise ratio, so as to stably and reliably estimate the signal-to-noise ratio.

SUMMARY

An object of the present disclosure is to provide a signal-to-noise ratio determining method and device for a receiving end of an information transmission system, and a channel equalization method and device based on an MMSE equalizer, to reduce the calculation amount for a signal-to-noise ratio, so as to stably and reliably estimate the signal-to-noise ratio.

In order to achieve the above object, the following technical solutions are provided in the present disclosure.

There is provided a signal-to-noise ratio determining method for a receiving end of an information transmission system. The signal-to-noise ratio determining method is based on an information transmission system in which timing synchronization is achieved by using a structure of a repetitive training sequence. The signal-to-noise ratio determining method includes:

acquiring a peak and a valley of an autocorrelation function, where the peak represents a sum of a signal average power and a noise average power, and the valley represents the noise average power; and determining a signal-to-noise ratio based on the peak and the valley.

The acquiring a peak and a valley of an autocorrelation function includes:

determining an autocorrelation function $R_{auto}(k+N)$ which is expressed as $$R_{auto}(k+N) = \frac{1}{N}\sum_{m=0}^{N-1} r(k+m)r(k+m+N)^*,$$

where k represents a subscript related to time, N represents a length of the repetitive training sequence, r(k+m) represents a signal at a time instant delayed than a time instant k by m sampling periods, m represents the number of delayed sampling periods, and $(.)^*$ represents a conjugate operation;

determining a peak $R_{auto}^{\Delta}(N)$ of the autocorrelation function from the autocorrelation function $R_{auto}(k+N)$, where in a case that there is no frequency offset in the information transmission system, the peak $R_{auto}^{\Delta}(N)$ is determined as $$R_{auto}^{\Delta}(N) = \frac{1}{N}\sum_{m=0}^{N-1} [s_{preamble}(k_{\Delta}+m) + w(k_{\Delta}+m)]$$

-continued $$[s_{preamble}(k_\Delta + m + N) + w(k_\Delta + m + N)]^*$$
$$= P_{signal} + P_{noise},$$

and in a case that there is a frequency offset which is expressed as $\varepsilon = f_{offset}/\Delta f$ in the information transmission system, the peak $R_{auto}^\Delta(N)$ is determined as $$R_{auto}^\Delta(N) = \frac{1}{N}\sum_{m=0}^{N-1}[s_{preamble}(k_\Delta + m) + w(k_\Delta + m)]$$
$$[s_{preamble}(k_\Delta + m + N) + w(k_\Delta + m + N)]^*$$
$$= P_{signal}e^{j2\pi k\varepsilon/N} + P_{noise},$$

where $f_{offset}$ represents a carrier offset, and $\Delta f$ represents a subcarrier frequency interval; and determining a valley $R_{auto}^\triangledown(N)$ of the autocorrelation function from the autocorrelation function $R_{auto}(k+N)$, where the valley $R_{auto}^\triangledown(N)$ is determined as $$R_{auto}^\triangledown(N) = \frac{1}{N}\sum_{m=0}^{N-1}w(k_\triangledown + m)[s_{preamble}(k_\triangledown + m) + w(k_\triangledown + m + N)]^*,$$
$$= P_{noise}$$

where $s_{preamble}(k)$ represents a training sequence, $w(k)$ represents a noise, $P_{signal}$ represents a signal average power, $P_{noise}$ represents a noise average power, $k_\Delta$ represents a time subscript corresponding to the peak, and $k_\triangledown$ represents a time subscript corresponding to the valley.

The determining a signal-to-noise ratio based on the peak and the valley includes: determining a signal-to-noise ratio SNR based on the peak $R_{auto}^\Delta(N)$ and the valley $R_{auto}^\triangledown(N)$ according to a signal-to-noise ratio determination rule which is expressed as $$SNR = \frac{|R_{auto}^\Delta(N)| - |R_{auto}^\triangledown(N)|}{|R_{auto}^\triangledown(N)|},$$

where |•| represents an absolute value operation.

A channel equalization method based on an MMSE equalizer is provided. The channel equalization method includes:

acquiring the signal-to-noise ratio determined by performing the signal-to-noise ratio determining method according to any one of claims 1 to 3, and acquiring a frequency domain channel impulse response;

determining an MMSE equalizer coefficient based on the signal-to-noise ratio and the frequency domain channel impulse response;

determining a scale correction factor based on an average frequency domain channel response, a signal average power and a noise average power; and performing an equalizing process on a received frequency domain signal based on the MMSE equalizer coefficient and the scale correction factor, to obtain a scale-corrected frequency domain signal.

The determining a scale correction factor based on an average frequency domain channel response, a signal average power and a noise average power includes:

determining a scale correction factor $\Theta$ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

A signal-to-noise ratio determining device for a receiving end of an information transmission system is provided. The signal-to-noise ratio determining device is based on an information transmission system in which timing synchronization is achieved by using a structure of a repetitive training sequence. The signal-to-noise ratio determining device includes:

a first acquiring module configured to acquire a peak and a valley of an autocorrelation function, where the peak represents a sum of a signal average power and a noise average power, and the valley represents the noise average power; and a signal-to-noise ratio determining module configured to determine a signal-to-noise ratio based on the peak and the valley.

The first acquiring module includes:

an autocorrelation function determining unit configured to determine an autocorrelation function $R_{auto}(k+N)$ which is expressed as $$R_{auto}(k+N) = \frac{1}{N}\sum_{m=0}^{N-1}r(k+m)r(k+m+N)^*,$$

where k represents a subscript related to time, N represents a length of the repetitive training sequence, r(k+m) represents a signal at a time instant delayed than a time instant k by m sampling periods, m represents the number of delayed sampling periods, and (.)* represents a conjugate operation;

a first peak determining unit configured to determine a peak $R_{auto}^\Delta(N)$ of the autocorrelation function from the autocorrelation function $R_{auto}(k+N)$, where in a case that there is no frequency offset in the information transmission system, the peak $R_{auto}^\Delta(N)$ is determined as $$R_{auto}^\Delta(N) = \frac{1}{N}\sum_{m=0}^{N-1}[s_{preamble}(k_\Delta + m) + w(k_\Delta + m)]$$
$$[s_{preamble}(k_\Delta + m + N) + w(k_\Delta + m + N)]^*$$
$$= P_{signal} + P_{noise};$$

a second peak determining unit configured to determine the peak $R_{auto}^\Delta(N)$ of the autocorrelation function from the autocorrelation function $R_{auto}(k+N)$, where in a case that there is a frequency offset which is expressed as $\varepsilon = f_{offset}/\Delta f$ in the information transmission system, the peak $R_{auto}^\Delta(N)$ is determined as $$R_{auto}^\Delta(N) = \frac{1}{N}\sum_{m=0}^{N-1}[s_{preamble}(k_\Delta + m) + w(k_\Delta + m)]$$

-continued $$[s_{preamble}(k_\Delta + m + N) + w(k_\Delta + m + N)]^*$$
$$= P_{signal}e^{j2\pi k\varepsilon/N} + P_{noise},$$

where $f_{offset}$ represents a carrier offset, and $\Delta f$ represents a subcarrier frequency interval; and a valley determining unit configured to determine a valley $R_{auto}^\nabla(N)$ of the autocorrelation function from the autocorrelation function $R_{auto}(k+N)$, where the valley $R_{auto}^\nabla(N)$ is determined as $$R_{auto}^\nabla(N) = \frac{1}{N}\sum_{m=0}^{N-1} w(k_\nabla + m)[s_{preamble}(k_\nabla + m) + w(k_\nabla + m + N)]^*$$
$$= P_{noise},$$

where $s_{preamble}(k)$ represents a training sequence, $w(k)$ represents a noise, $P_{signal}$ represents a signal average power, $P_{noise}$ represents a noise average power, $k_\Delta$ represents a time subscript corresponding to the peak, and $k_\nabla$ represents a time subscript corresponding to the valley.

The signal-to-noise ratio determining module is configured to determine a signal-to-noise ratio SNR based on the peak $R_{auto}^\Delta(N)$ and the valley $R_{auto}^\nabla(N)$ according to a signal-to-noise ratio determination rule which is expressed as $$SNR = \frac{|R_{auto}^\Delta(N)| - |R_{auto}^\nabla(N)|}{|R_{auto}^\nabla(N)|},$$

where $|\cdot|$ represents an absolute value operation.

A channel equalization device based on an MMSE equalizer is provided. The channel equalization device includes:

a second acquiring module configured to: acquire the signal-to-noise ratio determined by the signal-to-noise ratio determining device described above, and acquire a frequency domain channel impulse response;

an equalizer coefficient determining module configured to determine an MMSE equalizer coefficient based on the signal-to-noise ratio and the frequency domain channel impulse response;

a scale correction factor determining module configured to determine a scale correction factor based on an average frequency domain channel response, a signal average power and a noise average power; and a signal equalization module configured to: perform an equalizing process on a received frequency domain signal based on the MMSE equalizer coefficient and the scale correction factor, to obtain a scale-corrected frequency domain signal.

The scale correction factor determining module is configured to determine a scale correction factor $\Theta$ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

It can be seen from above that, in the information transmission system on which the above solutions are based, time and frequency synchronization is achieved by using a structure of a repetitive training sequence. The maximum value of an autocorrelation function is required to be determined, and symbol timing synchronization and carrier frequency offset estimation are performed respectively based on the position and the phase of the maximum value. Therefore, in the signal-to-noise ratio determining method and device for a receiving end of an information transmission system, based on independence between a signal and a noise, a signal-to-noise ratio can be stably and reliably estimated based on a peak and a valley of the autocorrelation function with no additional calculation complexity, so that the calculation amount for the signal-to-noise ratio can be reduced.

Further, in order to solve the problem that the scale of a constellation map of an output signal of the MMSE equalizer changes with factors such as the signal-to-noise ratio, a channel equalization method based on an MMSE equalizer is provided. In this method, an MMSE equalizer coefficient is determined based on a stable and reliable signal-to-noise ratio obtained by performing the signal-to-noise ratio determining method described above, and a scale correction factor is determined based on an average frequency domain channel response, a signal average power and a noise average power. In this way, the MMSE equalizer can have an excellent equalization performance, and also can stabilize the scale of the constellation map of the output signal of the MMSE equalizer by scale correction, so that a subsequent soft demapping module can work normally.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description only show some embodiments of the present disclosure, and other drawings may be obtained by those skilled in the art from the drawings without any creative work.

DETAILED DESCRIPTION OF THE EMBODIMENTS

Figure 1:
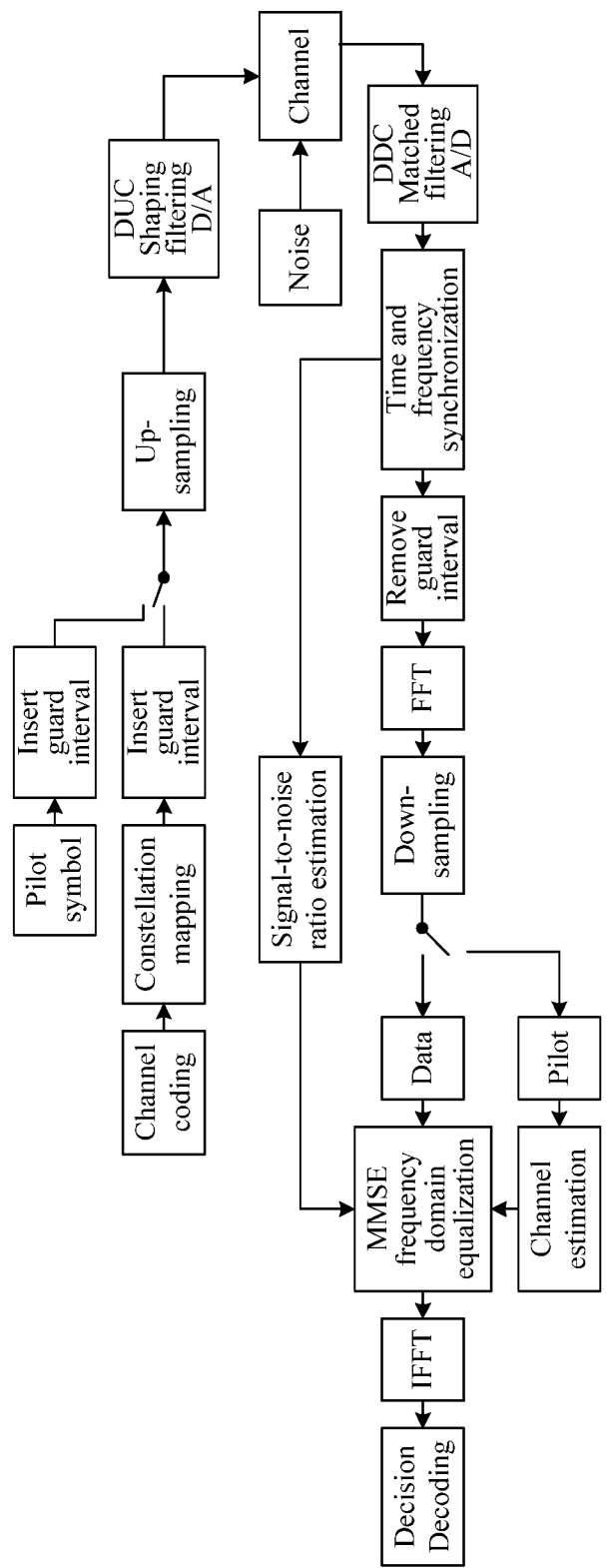
FIG. 1 is a schematic diagram showing a transmission process of an SCFDE system in the conventional technology.

Technical solutions of embodiments of the present disclosure are clearly and completely described in the following in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative work fall in the scope of protection of the present disclosure.

There are provided a signal-to-noise ratio determining method and device for a receiving end of an information transmission system, and a channel equalization method and device based on an MMSE equalizer in the present disclosure, to reduce the calculation amount for a signal-to-noise ratio, so as to stably and reliably estimate the signal-to-noise ratio.

It is assumed that, a transmitted signal is indicated by $s(k)$, average power of the transmitted signal is equal to 1, a sampling frequency is indicated by $1/T$, and a channel impulse response of $s(k)$ is indicated by $h(l)$, where $l=0, 1, \cdots, L-1$, and L represents the number of taps of the channel impulse response. An additive white gaussian noise may be indicated by $w(k)$, and average power of the noise is indicated by $P_{noise}$. In this case, a received signal $r(k)$ at a receiving end in a time domain may be expressed as:

$$r(k) = \sum_{l=0}^{L-1} h(l)s(k-l) + w(k) \qquad (1)$$
$$= h(k) * s(k) + w(k)$$

where * represents a linear convolution operation. Due to introduction of a cyclic prefix, the linear convolution operation between the signal $s(k)$ and the channel impulse response $h(k)$ may be converted into a circular convolution operation. That is, in a case that a duration $T_G$ of the cyclic prefix meets $T_G \geq \tau_{max}$, where $\tau_{max}$ represents the maximum delay spread, and receiving and transmitting of the system are strictly synchronized with each other, the following expression may be obtained after the cyclic prefix is removed:

$$r(k) = h(k) \otimes s(k) + w(k), 0 \leq k \leq N_F - 1 \qquad (2)$$

where $\otimes$ represents a circular convolution operation, $N_F$ represents the number of FFT points. After an FFT transformation is performed on the expression (2), a frequency domain expression of the received signal $r(k)$ is obtained as follows.

$$R(k) = H(k)S(k) + W(k), 0 \leq k \leq N_F - 1 \qquad (3)$$

where $R(k)$, $H(k)$, $S(k)$, and $W(k)$ respectively indicate frequency domain representations of $r(k)$, $h(k)$, $s(k)$, and $w(k)$. Channel estimation and frequency domain equalization for the SCFDE system are performed based on the expression (3).

It is assumed that an equalizer coefficient is indicated by $C(k)$. In this case, an equalized frequency domain output may be expressed as $$\hat{S}(k) = C(k)H(k)S(k) + C(k)W(k), 0 \leq k \leq N_F - 1 \qquad (4)$$

According to a definition of a mean square error MSE, the MSE after equalization is derived as follows.

$$MSE = E\left[\sum_{k=0}^{N_F-1} |\hat{S}(k) - S(k)|^2\right] \qquad (5)$$
$$= \sum_{k=0}^{N_F-1} E[|(C(k)H(k) - 1)S(k) + C(k)W(k)|^2]$$

In a case that the mean square error MSE reaches the minimum, a minimum mean square error MMSE equalizer having the following equalizer coefficient is obtained.

$$C_{MMSE}(k) = \frac{H^*(k)P_{signal}}{|H(k)|^2 P_{signal} + P_{noise}} = \frac{H^*(k)}{|H(k)|^2 + \frac{1}{SNR}} \qquad (6)$$

where $P_{signal}$ represents a signal average power, $P_{noise}$ represents a noise average power, and SNR represents a signal-to-noise ratio. It can be seen from the expression (6) that, for the implementation of the MMSE equalizer, the following two problems are required to be solved. One problem to be solved is that the signal-to-noise ratio should be accurately estimated, which is crucial in implementing the MMSE equalization. The other one problem to be solved is that, automatic gain control (AGC) of the system cannot ensure that the average power of the received signal is fixed at a certain value, but only can ensure that the average power of the received signal is in a certain range. In this case, relative values of parameters such as the signal average power, the noise average power and the channel estimation value may change, which results in a change of a scale of a constellation map of an output signal after equalization, and further results in a soft demapping module failing to work normally. Therefore, the scale change is required to be suppressed.

Figure 2:
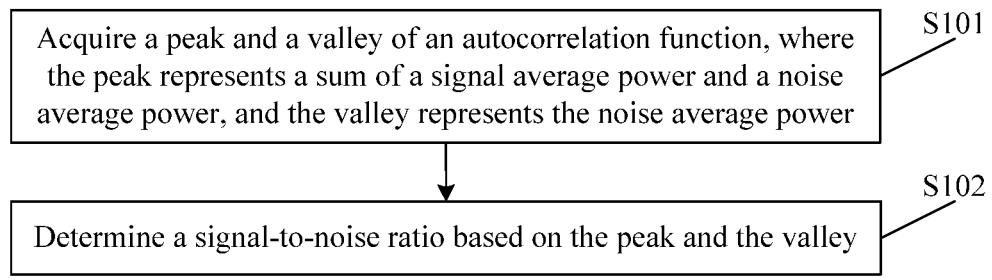
FIG. 2 is a schematic flowchart showing a signal-to-noise ratio determining method for a receiving end of an information transmission system according to an embodiment of the present disclosure.

In most of existing data-aided signal-to-noise ratio estimation methods, the signal-to-noise ratio is estimated without considering the whole system. In this case, a frame structure is always required to be designed separately, and calculation complexity is large. Referring to FIG. 2, a signal-to-noise ratio determining method for a receiving end of an information transmission system is provided according to an embodiment of the present disclosure. The signal-to-noise ratio determining method is based on an information transmission system in which timing synchronization is achieved by using a structure of a repetitive training sequence. The signal-to-noise ratio determining method includes the following steps S101 and S102.

In S101, a peak and a valley of an autocorrelation function are acquired. The peak represents a sum of a signal average power and a noise average power, and the valley represents the noise average power.

It should be noted that, in an information transmission system such as an SCFDE system and an OFDM system, a repetitive pilot structure is usually used to achieve time and frequency synchronization, and related parameters of an autocorrelation function are required to be determined in a process of implementing the time and frequency synchronization algorithm by using a structure of a repetitive training sequence. Specifically, symbol timing synchronization and carrier frequency offset estimation are respectively performed based on a position and a phase of the maximum value of the autocorrelation function. Therefore, with this solution, in the process of implementing the time and frequency synchronization, the signal-to-noise ratio can be determined based on the peak and the valley of the autocorrelation function with no additional calculation complexity, thereby achieving the estimation for the signal-to-noise ratio and facilitating hardware implementation.

In S102, a signal-to-noise ratio is determined based on the peak and the valley.

It can be understood that, the signal-to-noise ratio can be determined based on the peak and the valley of the autocorrelation function, because the peak of the autocorrelation function represents the sum of the signal average power and the noise average power, and the valley of the autocorrelation function represents the noise average power. According to a definition of the signal-to-noise ratio, the signal-to-noise ratio SNR can be determined based on a peak $R_{auto}^{\Delta}(N)$ and a valley $R_{auto}^{\nabla}(N)$ according to a signal-to-noise ratio determination rule, where the signal-to-noise ratio determination rule is expressed as $$SNR = \frac{|R_{auto}^{\Delta}(N)| - |R_{auto}^{\nabla}(N)|}{|R_{auto}^{\nabla}(N)|}.$$

It can be seen that, with this solution, the signal-to-noise ratio can be accurately estimated by performing a simple operation on the peak and the valley of the autocorrelation function.

Based on the above embodiments, in this embodiment, the process of acquiring the peak and the valley of the autocorrelation function is performed by the following steps including:

determining an autocorrelation function $R_{auto}(k+N)$ which is expressed as $$R_{auto}(k+N) = \frac{1}{N}\sum_{m=0}^{N-1} r(k+m)r(k+m+N)^{*},$$

where k represents a subscript related to time, N represents a length of the repetitive training sequence, r(k+m) represents a signal at a time instant delayed than a time instant k by m sampling periods, m represents the number of delayed sampling periods, and $(.)^{*}$ represents a conjugate operation;

determining a peak $R_{auto}^{\Delta}(N)$ of the autocorrelation function from the autocorrelation function $R_{auto}(k+N)$, where in a case that there is no frequency offset in the information transmission system, the peak $R_{auto}^{\Delta}(N)$ is determined as $$R_{auto}^{\Delta}(N) = \frac{1}{N}\sum_{m=0}^{N-1} [s_{preamble}(k_{\Delta}+m) + w(k_{\Delta}+m)]$$
$$[s_{preamble}(k_{\Delta}+m+N) + w(k_{\Delta}+m+N)]^{*}$$
$$= P_{signal} + P_{noise},$$

and in a case that there is a frequency offset which is expressed as $\varepsilon = f_{offset}/\Delta f$ in the information transmission system, the peak $R_{auto}^{\Delta}(N)$ is determined as $$R_{auto}^{\Delta}(N) = \frac{1}{N}\sum_{m=0}^{N-1} [s_{preamble}(k_{\Delta}+m) + w(k_{\Delta}+m)]$$
$$[s_{preamble}(k_{\Delta}+m+N) + w(k_{\Delta}+m+N)]^{*}$$
$$= P_{signal}e^{j2\pi k\varepsilon/N} + P_{noise},$$

where $f_{offset}$ represents a carrier offset, and $\Delta f$ represents a subcarrier frequency interval; and determining a valley $R_{auto}^{\nabla}(N)$ of the autocorrelation function from the autocorrelation function $R_{auto}(k+N)$, where the valley $R_{auto}^{\nabla}(N)$ is determined as $$R_{auto}^{\nabla}(N) = \frac{1}{N}\sum_{m=0}^{N-1} w(k_{\nabla}+m)[s_{preamble}(k_{\nabla}+m) + w(k_{\nabla}+m+N)]^{*},$$
$$= P_{noise}$$

where $s_{preamble}(k)$ represents a training sequence, w(k) represents a noise, $P_{signal}$ represents a signal average power, $P_{noise}$ represents a noise average power, $k_{\Delta}$ represents a time subscript corresponding to the peak, and $k_{\nabla}$ represents a time subscript corresponding to the valley.

Figure 3:
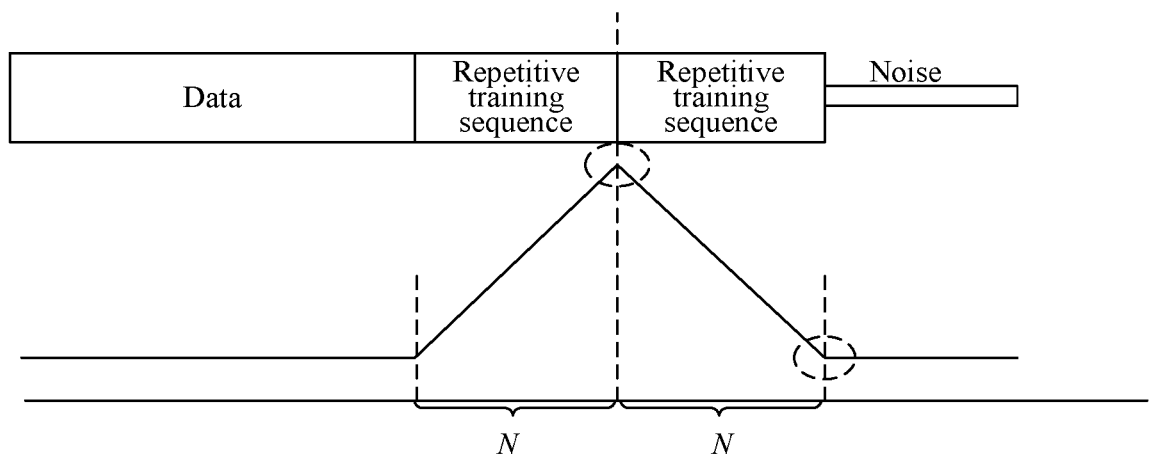
FIG. 3 is a schematic diagram showing signal-to-noise ratio estimation based on a structure of a repetitive training sequence according to an embodiment of the present disclosure.

Reference is made to FIG. 3, which is a schematic diagram showing a signal-to-noise ratio estimation based on a structure of a repetitive training sequence according to an embodiment of the present disclosure. It should be noted that, there may be multiple repetitive training sequences in an actual system, but the multiple repetitive training sequences do not bring a qualitative change to the signal-to-noise ratio estimation. The valley and the peak are acquired from results of first two repetitive training sequences among the repetitive training sequences. In this embodiment, the following description is given by taking only two repetitive training sequences as an example. It is assumed that, a length of the repetitive training sequence is indicated by N. In this case, an autocorrelation function of the received signal that is delayed by N sampling instants may be calculated as follows.

$$R_{auto}(k+N) = \frac{1}{N}\sum_{m=0}^{N-1} r(k+m)r(k+m+N)^{*}, \quad (7)$$

where $(.)^{*}$ represents a conjugate operation. In a process of calculating the peak of the autocorrelation function, whether there is a frequency offset between a receiving end and a transmitting end of the information transmission system should be taken in consideration. In a case that there is no frequency offset between the receiving end and the transmitting end of the information transmission system, the peak $R_{auto}^{\Delta}(N)$ of the autocorrelation function may be determined as:

$$R_{auto}^{\Delta}(N) = \frac{1}{N}\sum_{m=0}^{N-1}[s_{preamble}(k_{\Delta}+m)+w(k_{\Delta}+m)] \quad (8)$$
$$[s_{preamble}(k_{\Delta}+m+N)+w(k_{\Delta}+m+N)]^*$$
$$= \frac{1}{N}\sum_{m=0}^{N-1}[s_{preamble}(k_{\Delta}+m)+w(k_{\Delta}+m)]$$
$$[s_{preamble}(k_{\Delta}+m)+w(k_{\Delta}+m+N)]^*$$
$$= P_{signal}+P_{noise}$$

where $s_{preamble}(m)$ represents a training sequence, $P_{signal}$ represents a signal average power, $P_{noise}$ represents a noise average power, and $k_{\Delta}$ represents a time subscript corresponding to the peak. It can be seen that the peak appears in a hill shape, and it takes N sampling periods from the bottom of the hill to the top of the hill.

In a case that there is a frequency offset between the receiving end and the transmitting end of the information transmission system, it is assumed that there is a normalized frequency offset $\varepsilon = f_{offset}/\Delta f$ between the receiving end and the transmitting end, where $f_{offset}$ represents a carrier offset, and $\Delta f$ represents a subcarrier frequency interval. In this case, the peak $R_{auto}^{\Delta}(N)$ of the autocorrelation function may be determined as $$R_{auto}^{\Delta}(N) = \frac{1}{N}\sum_{m=0}^{N-1}[s_{preamble}(k_{\Delta}+m)+w(k_{\Delta}+m)] \quad (9)$$
$$[s_{preamble}(k_{\Delta}+m+N)+w(k_{\Delta}+m+N)]^*$$
$$= \frac{1}{N}\sum_{m=0}^{N-1}[s_{preamble}(k_{\Delta}+m)+w(k_{\Delta}+m)]$$
$$[s_{preamble}(k_{\Delta}+m)e^{j2\pi k\varepsilon/N}+w(k_{\Delta}+m+N)]^*$$
$$= P_{signal}e^{j2\pi k\varepsilon/N}+P_{noise}$$

It can be seen that the frequency offset does not affect the algorithm for calculating the signal-to-noise ratio, and only causes the peak of the autocorrelation function to have a phase related to the frequency offset. The phase can be used to implement estimation for the frequency offset.

In addition, it is assumed that the noise in the channel is a gaussian white noise and is independent of the transmitted signal. In this case, the valley of the autocorrelation function $R_{auto}(k+N)$ may be determined as $$R_{auto}^{\nabla}(N) = \frac{1}{N}\sum_{m=0}^{N-1}w(k_{\nabla}+m)[s_{preamble}(k_{\nabla}+m)+ \quad (10)$$
$$w(k_{\nabla}+m+N)]^*$$
$$= P_{noise}$$

Further, according to the definition of the signal-to-noise ratio, the signal-to-noise ratio SNR may be determined based on the peak $R_{auto}^{\Delta}(N)$, and the valley $R_{auto}^{\nabla}(N)$ as follows.

$$SNR = \frac{|R_{auto}^{\Delta}(N)|-|R_{auto}^{\nabla}(N)|}{|R_{auto}^{\nabla}(N)|} \quad (11)$$

where |•| represents an absolute value operation.

Figure 4:
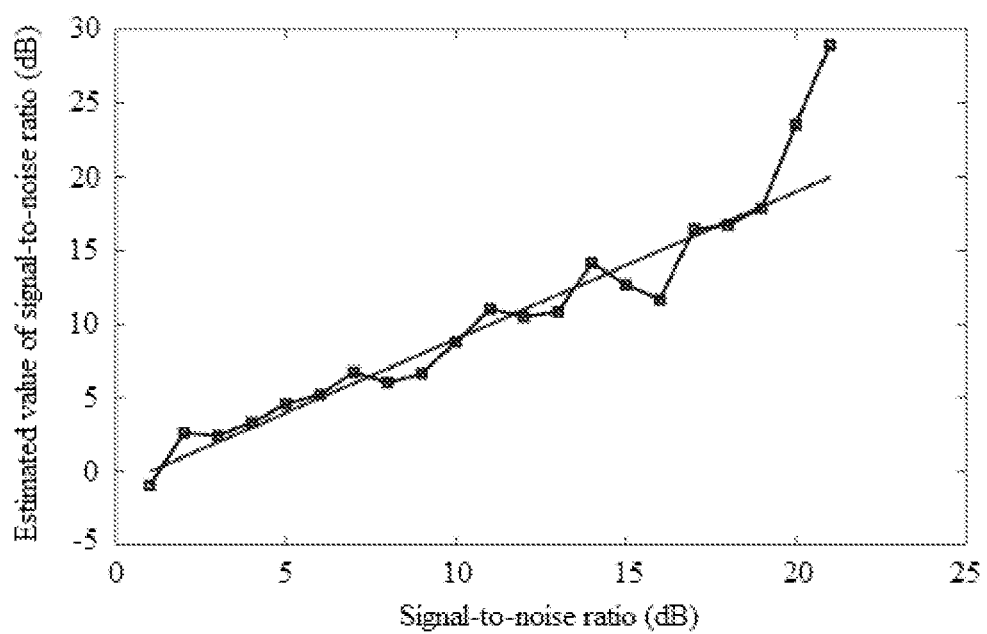
FIG. 4 is a schematic diagram showing a relationship between an actual value and an estimated value of an SNR according to an embodiment of the present disclosure.

It can be seen from the above that, in this solution, the frequency offset estimation and the signal-to-noise ratio estimation can be achieved by determining the peak of the delayed autocorrelation function of the received signal, where the absolute value of the peak is used for the signal-to-noise ratio estimation, and the phase of the peak is used for the frequency offset estimation. Reference is made to FIG. 4, which is a schematic diagram showing a relationship between an actual value and an estimated value of an SNR according to an embodiment of the present disclosure. A straight line indicates the estimated value, and a broken line indicates the actual value. It can be seen that, there is a substantially linear relationship between the estimated value and the actual value, and thus the signal-to-noise ratio of the system can be stably and reliably estimated with the solution of the present disclosure.

Figure 5A:
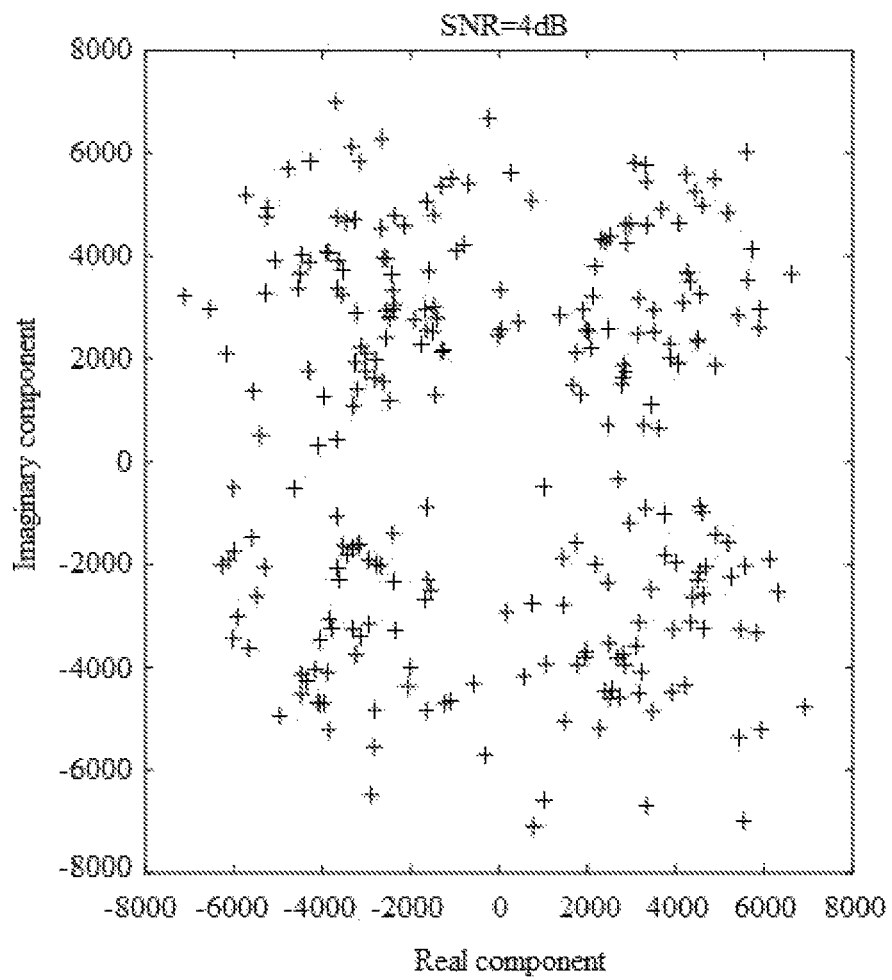
FIG. 5a shows a constellation map of an output signal of an MMSE equalizer in a case that the signal-to-noise ratio is 4 dB according to an embodiment of the present disclosure.
Figure 5B:
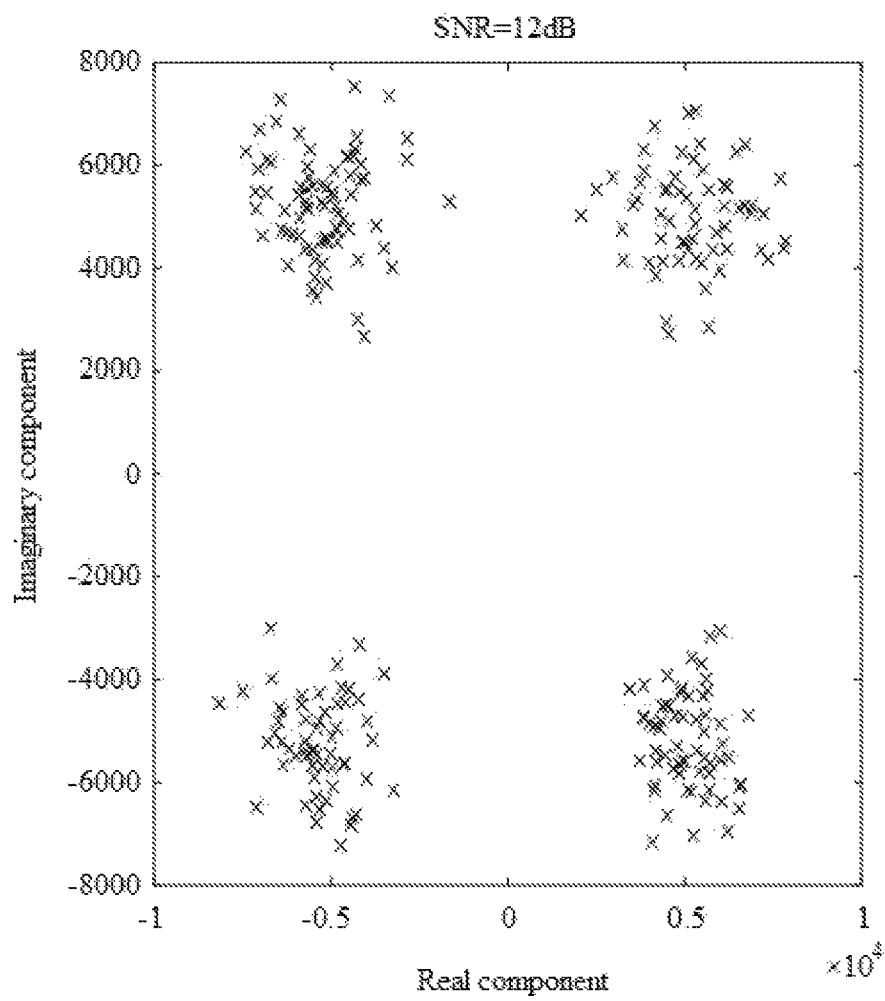
FIG. 5b shows a constellation map of the output signal of the MMSE equalizer in a case that the signal-to-noise ratio is 12 dB according to the embodiment of the present disclosure.

It should be noted that, the MMSE equalization algorithm expressed by the expression (6) may result in the scale of the constellation map of the signal after equalization changing with factors such as the signal-to-noise ratio. FIG. 5a shows a constellation map of an output signal of an MMSE equalizer in a case that the signal-to-noise ratio is 4 dB, and FIG. 5b shows a constellation map of the output signal of the MMSE equalizer in a case that the signal-to-noise ratio is 12 dB. It can be seen that, the scale of the constellation map of the output signal of the equalizer is decreased with increase of the signal-to-noise ratio. The decreased scale of the constellation map may result in the subsequent soft demapping module failing to work normally. Further, in the actual implementation process, the automatic gain control (AGC) is required to ensure a level of the received signal of the system. However, the AGC cannot ensure that the average power of the received signal is constant, but only can ensure that the average power of the received signal is in a certain range. In this case, the channel estimation value may change, which also results in the change of the constellation map of the output signal of the MMSE equalizer.

Figure 6:
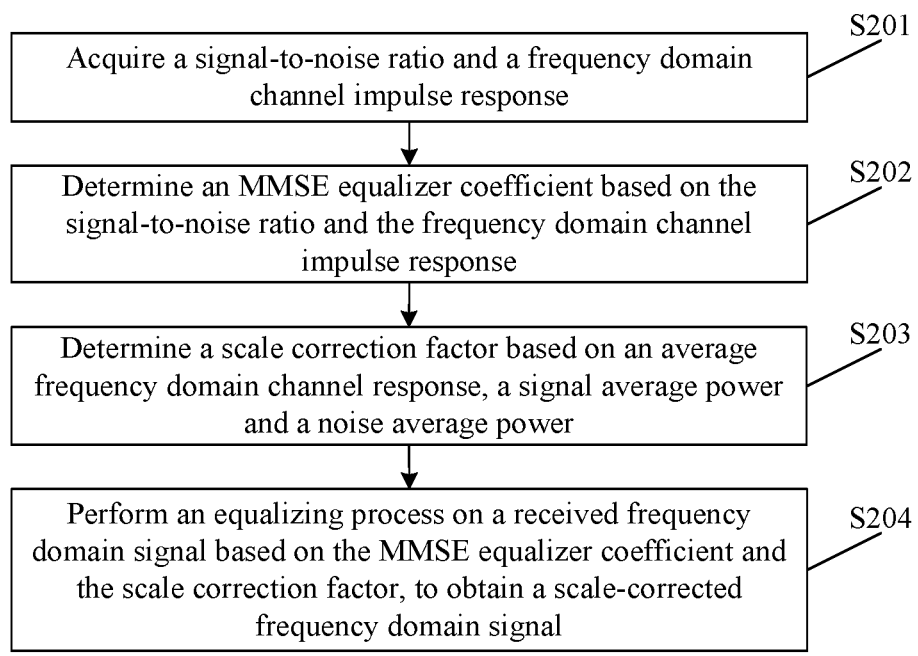
FIG. 6 is a schematic flowchart showing a channel equalization method based on an MMSE equalizer according to an embodiment of the present disclosure.

Referring to FIG. 6, a channel equalization method based on an MMSE equalizer is provided according to the embodiment of the present disclosure, to solve the problem that the subsequent soft demapping module fails to work normally, which is caused by the fact that the scale of the constellation map of the signal after equalization changes with the factors such as the signal-to-noise ratio. The channel equalization method includes the following steps S201 to S204.

In S201, a signal-to-noise ratio and a frequency domain channel impulse response are acquired.

Specifically, the signal-to-noise ratio is determined by performing the signal-to-noise ratio determining method according to any one of the above embodiments, and the specific determination process thereof is described in the embodiment of the signal-to-noise ratio determining method, which is not repeated herein.

In S202, an MMSE equalizer coefficient is determined based on the signal-to-noise ratio and the frequency domain channel impulse response.

Specifically, the MMSE equalizer coefficient in this embodiment is calculated in the same manner as that in expression (6). That is, the MMSE equalizer coefficient $C_{MMSE}(k)$ is expressed as:

$$C_{MMSE}(k) = \frac{H^*(k)P_{signal}}{|H(k)|^2 P_{signal} + P_{noise}} = \frac{H^*(k)}{|H(k)|^2 + \frac{1}{SNR}} \quad (12)$$

where the signal-to-noise ratio SNR in expression (12) is obtained by performing the signal-to-noise ratio determining method described above.

In S203, a scale correction factor is determined based on an average frequency domain channel response, a signal average power, and a noise average power.

The process of determining the scale correction factor based on the average frequency domain channel response, the signal average power and the noise average power is performed by the following steps including:

determining a scale correction factor Θ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

Specifically, in this embodiment, the calculating method for the MMSE equalizer coefficient expressed by the expression (6) is modified as follows.

$$C_{MMSE}(k) = \frac{H^*(k)P_{signal}}{|H(k)|^2 P_{signal} + P_{noise}} \quad (13)$$

$$= \frac{H^*(k)P_{signal}}{|H(k)|^2 P_{signal} + P_{noise}} \cdot \frac{|\overline{H}|^2 P_{signal} + P_{noise}}{|\overline{H}|^2 P_{signal}}$$

$$= \frac{H^*(k)P_{signal}}{|H(k)|^2 P_{signal} + P_{noise}} \Theta$$

where $$\Theta = \frac{|\overline{H}|^2 P_{signal} + P_{noise}}{|\overline{H}|^2 P_{signal}}. \quad (14)$$

In S204, an equalizing process is performed on a received frequency domain signal based on the MMSE equalizer coefficient and the scale correction factor, to obtain a scale-corrected frequency domain signal.

An LS equalization algorithm expressed by the following expression (15) is given to better understand why the scale correction can be achieved by using the MMSE equalizer $$C_{LS}(k) = \frac{H^*(k)}{|H(k)|^2} \quad (15)$$

It can be proved that, a scale of a constellation map of an output signal of an LS equalizer does not change with the factors such as the signal-to-noise ratio. Based on the above, the MMSE equalizer expressed by the expression (6) is replaced by the equalizer expressed by the expression (13). It can be seen that, compared with the LS equalizer expressed by the expression (15), the MMSE equalizer expressed by the expression (13) not only can have an excellent performance by taking the influence of the signal-to-noise ratio into consideration, but also can have the same property as the LS equalizer that the scale of the constellation map of the output signal does not change with the signal-to-noise ratio by introducing the scale correction factor Θ, thereby eliminating the change of the scale of the constellation map of the output signal of the equalizer due to the signal-to-noise ratio and the channel estimation value.

Figure 7:
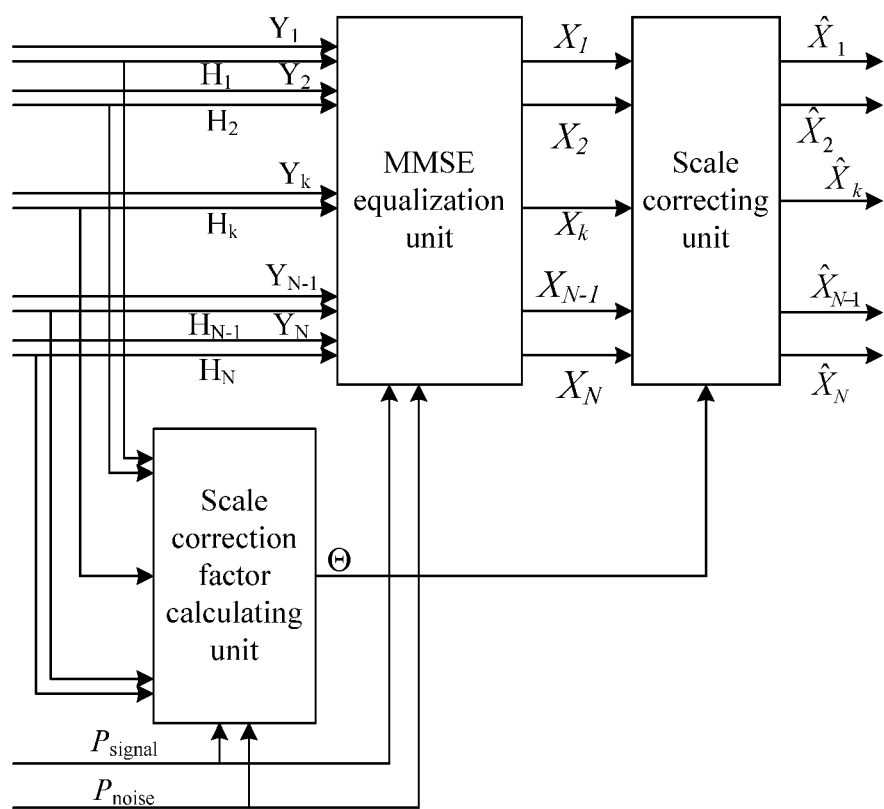
FIG. 7 is a schematic block diagram showing an MMSE channel equalization method according to an embodiment of the present disclosure.

Reference is made to FIG. 7, which is a schematic block diagram showing an MMSE channel equalization method according to an embodiment of the present disclosure. Three components are shown in FIG. 7, including an MMSE equalization unit, a scale correction factor calculating unit and a scale correcting unit. The MMSE equalization unit is used to perform a process by using a received frequency domain signal Y, an estimated frequency domain channel response H, a signal power P, and a noise power N according to the algorithm expressed by the expression (12), to obtain a constellation map $\tilde{X}$ of the signal after equalization. The scale correction factor calculating unit is used to perform a process by using the estimated frequency domain channel response H, the signal power P, and the noise power N according to the algorithm expressed by the expression (13), to obtain a scale correction factor Θ. The scale correcting unit is used to obtain a scale-corrected constellation map $\hat{X}$ based on the scale correction factor Θ and the constellation map $\tilde{X}$ of the signal after equalization.

Figure 8A:
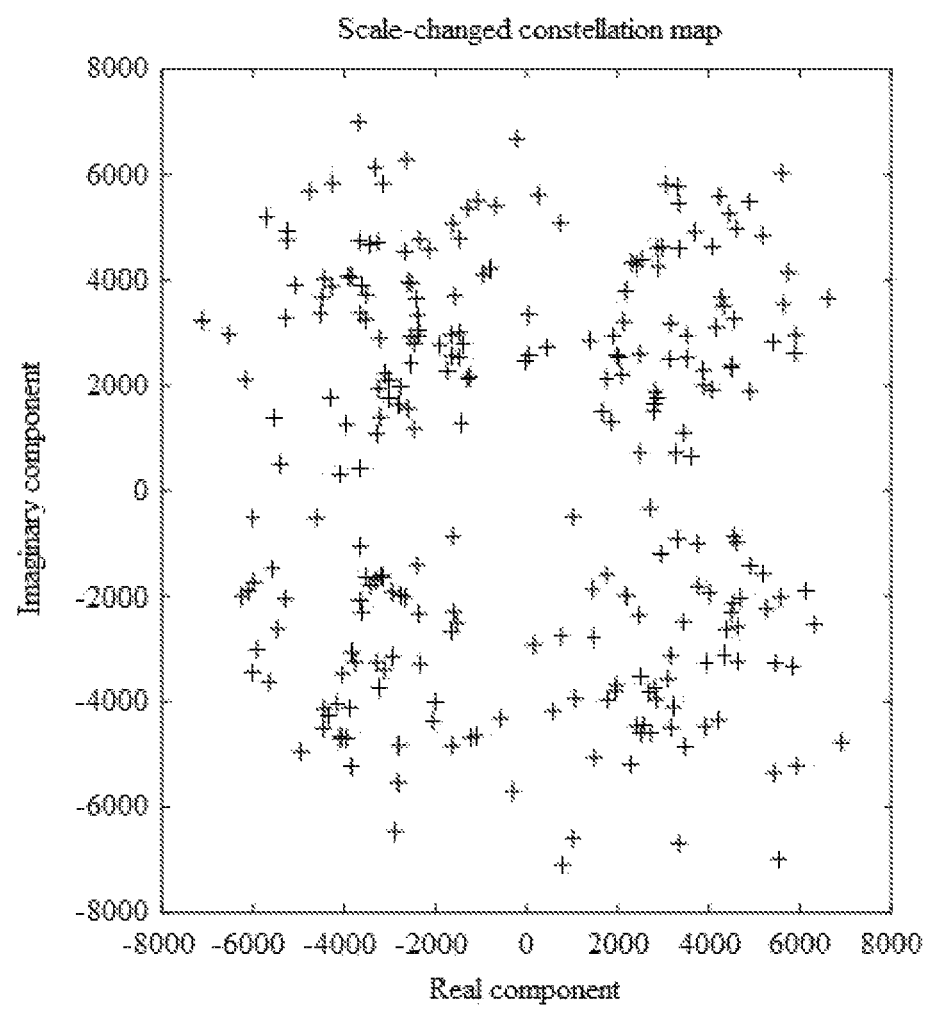
FIG. 8a shows a scale-changed constellation map in a case that the signal-to-noise ratio is 4 dB according to an embodiment of the present disclosure.
Figure 8B:
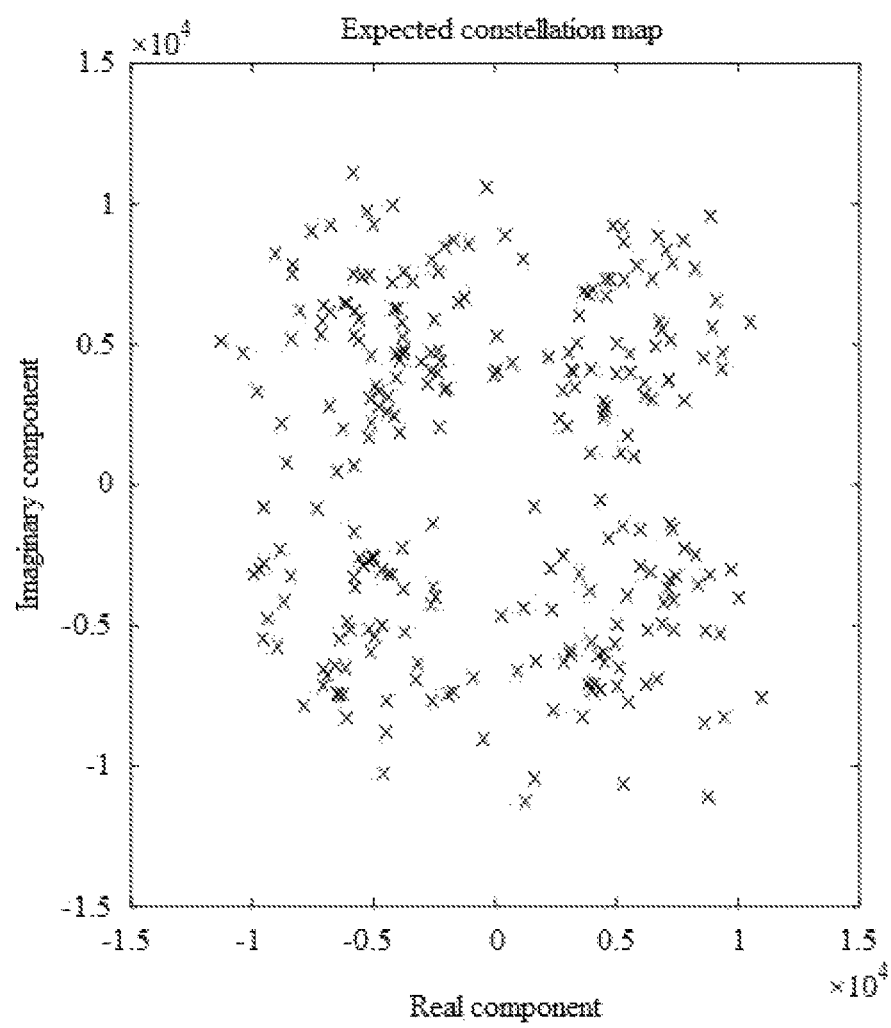
FIG. 8b shows an expected constellation map in the case that the signal-to-noise ratio is 4 dB according to the embodiment of the present disclosure.

FIG. 8a shows a scale-changed constellation map in a case that the signal-to-noise ratio is 4 dB, and FIG. 8b shows an expected constellation map in the case that the signal-to-noise ratio is 4 dB. It can be seen that, in the embodiment of the present disclosure, the scale of the constellation map of the output signal of the equalizer no longer changes with the factors such as the signal-to-noise ratio and the adjustment of the AGC signal by the scale correction, and the difference between the scale-changed constellation map and the expected constellation map is small.

A signal-to-noise ratio determining device according to an embodiment of the present disclosure is described below. The signal-to-noise ratio determining device described below and the signal-to-noise ratio determining method described above may be referred to each other.

Figure 9:
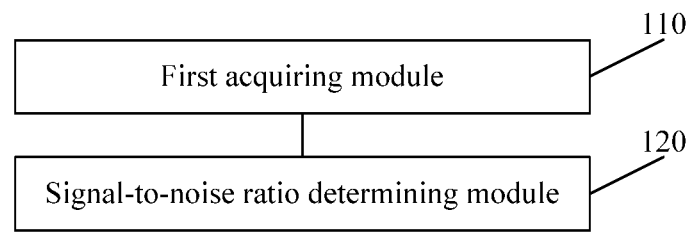
FIG. 9 is a schematic structural diagram showing a signal-to-noise ratio determining device for a receiving end of an information transmission system according to an embodiment of the present disclosure.

Referring to FIG. 9, a signal-to-noise ratio determining device for a receiving end of an information transmission system is provided according to an embodiment of the present disclosure. The signal-to-noise ratio determining device is based on an information transmission system in which timing synchronization is achieved by using a structure of a repetitive training sequence. The signal-to-noise ratio determining device includes: a first acquiring module 110, and a signal-to-noise ratio determining module 120.

The first acquiring module 110 is configured to acquire a peak and a valley of an autocorrelation function. The peak represents a sum of a signal average power and a noise average power, and the valley represents the noise average power.

The signal-to-noise ratio determining module 120 is configured to determine a signal-to-noise ratio based on the peak and the valley.

The first acquiring module 110 includes: an autocorrelation function determining unit, a first peak determining unit, a second peak determining unit and a valley determining unit.

The autocorrelation function determining unit is configured to determine an autocorrelation function $R_{auto}(k+N)$ which is expressed as $$R_{auto}(k+N) = \frac{1}{N}\sum_{m=0}^{N-1} r(k+m)r(k+m+N)^*,$$

where k represents a subscript related to time, N represents a length of the repetitive training sequence, r(k+m) represents a signal at a time instant delayed than a time instant k by m sampling periods, m represents the number of delayed sampling periods, and (.)* represents a conjugate operation.

The first peak determining unit is configured to determine a peak $R_{auto}^{\Delta}(N)$ of the autocorrelation function from the autocorrelation function $R_{auto}(k+N)$, where in a case that there is no frequency offset in the information transmission system, the peak $R_{auto}^{\Delta}(N)$ is determined as $$R_{auto}^{\Delta}(N) = \frac{1}{N}\sum_{m=0}^{N-1} [s_{preamble}(k_{\Delta}+m) + w(k_{\Delta}+m)]$$
$$[s_{preamble}(k_{\Delta}+m+N) + w(k_{\Delta}+m+N)]^*$$
$$= P_{signal} + P_{noise}.$$

The second peak determining unit configured to determine the peak $R_{auto}^{\Delta}(N)$ of the autocorrelation function from the autocorrelation function $R_{auto}(k+N)$, where in a case that there is a frequency offset which is expressed as $\varepsilon = f_{offset}/\Delta f$ in the information transmission system, the peak $R_{auto}^{\Delta}(N)$ is determined as $$R_{auto}^{\Delta}(N) = \frac{1}{N}\sum_{m=0}^{N-1} [s_{preamble}(k_{\Delta}+m) + w(k_{\Delta}+m)]$$
$$[s_{preamble}(k_{\Delta}+m+N) + w(k_{\Delta}+m+N)]^*$$
$$= P_{signal}e^{j2\pi k\varepsilon/N} + P_{noise},$$

where $f_{offset}$ represents a carrier offset, and $\Delta f$ represents a subcarrier frequency interval.

The valley determining unit is configured to determine a valley $R_{auto}^{\nabla}(N)$ of the autocorrelation function from the autocorrelation function $R_{auto}(k+N)$, where the valley $R_{auto}^{\nabla}(N)$ is determined as $$R_{auto}^{\nabla}(N) = \frac{1}{N}\sum_{m=0}^{N-1} w(k_{\nabla}+m)[s_{preamble}(k_{\nabla}+m) + w(k_{\nabla}+m+N)]^*$$
$$= P_{noise},$$

where $s_{preamble}(k)$ represents a training sequence, w(k) represents a noise, $P_{signal}$ represents a signal average power, $P_{noise}$ represents a noise average power, $k_{\Delta}$ represents a time subscript corresponding to the peak, and $k_{\nabla}$ represents a time subscript corresponding to the valley.

The signal-to-noise ratio determining module is configured to determine a signal-to-noise ratio SNR based on the peak $R_{auto}^{\Delta}(N)$ and the valley $R_{auto}^{\nabla}(N)$ according to a signal-to-noise ratio determination rule which is expressed as $$SNR = \frac{|R_{auto}^{\Delta}(N)| - |R_{auto}^{\nabla}(N)|}{|R_{auto}^{\nabla}(N)|},$$

where |•| represents an absolute value operation.

A signal-to-noise ratio determining device is further provided according to an embodiment of the present disclosure, which includes: a memory and a processor. The memory is configured to store a computer program. The processor is configured to implement the steps of the signal-to-noise ratio determining method described above when executing the computer program.

A computer readable storage medium is further provided according to an embodiment of the present disclosure. A computer program is stored on the computer readable storage medium. The computer program is executed by a processor to implement the steps of the signal-to-noise ratio determining method described above.

The storage medium may include: a U-disk, a mobile hard disk, a read-only memory (ROM), a random access memory (RAM), a disk, a disc, or any medium which can store a program code.

A channel equalization device according to an embodiment of the present disclosure is described below. The channel equalization device described below and the channel equalization method described above can be referred to each other.

Figure 10:
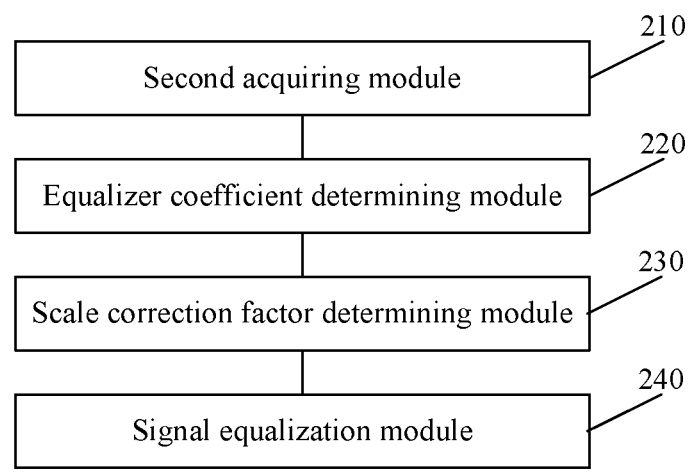
FIG. 10 is a schematic structural diagram showing a channel equalization device based on an MMSE equalizer according to an embodiment of the present disclosure.

Referring to FIG. 10, a channel equalization device based on an MMSE equalizer is provided according to an embodiment of the present disclosure. The channel equalization device includes: a second acquiring module 210, an equalizer coefficient determining module 220, a scale correction factor determining module 230, and a signal equalization module 240.

The second acquiring module 210 is configured to: acquire the signal-to-noise ratio determined by the signal-to-noise ratio determining device, and acquire a frequency domain channel impulse response.

The equalizer coefficient determining module 220 is configured to determine an MMSE equalizer coefficient based on the signal-to-noise ratio and the frequency domain channel impulse response.

The scale correction factor determining module 230 is configured to determine a scale correction factor based on an average frequency domain channel response, a signal average power and a noise average power.

The signal equalization module 240 is configured to: perform an equalizing process on a received frequency domain signal based on the MMSE equalizer coefficient and the scale correction factor, to obtain a scale-corrected frequency domain signal.

The scale correction factor determining module is configured to determine a scale correction factor $\Theta$ based on an average frequency domain channel response $\bar{H}$, a signal average power $P_{signal}$, and a noise average power $P_{noise}$ according to a scale correction factor determination rule which is expressed as $$\Theta = \frac{|\bar{H}|^2 P_{signal} + P_{noise}}{|\bar{H}|^2 P_{signal}}.$$

It should be noted that, the scale correction factor determining module 230 in this embodiment may be understood as the scale correction factor calculating unit in the channel equalization method, and is used to determine the scale correction factor. The signal equalization module 240 in this embodiment includes the MMSE equalization unit and the scale correcting unit in the channel equalization method, and is used to determine and correct a constellation map of a signal.

A channel equalization device based on an MMSE equalizer is further provided according to an embodiment of the present disclosure, which includes: a memory and a processor. The memory is configured to store a computer program. The processor is configured to implement the steps of the channel equalization method described above when executing the computer program.

A computer readable storage medium is further provided according to an embodiment of the present disclosure. A computer program is stored on the computer readable storage medium. The computer program is executed by a processor to implement the steps of the channel equalization method described above.

The storage medium may include: a U-disk, a mobile hard disk, a read-only memory (ROM), a random access memory (RAM), a disk, a disc, or any medium which can store a program code.

Embodiments in this specification are described in a progressive manner, each of the embodiments emphasizes differences from other embodiments, and the same or similar parts among the embodiments can be referred to each other.

Based on the above description of the disclosed embodiments, those skilled in the art can implement or carry out the present disclosure. It is apparent for those skilled in the art to make various modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A signal-to-noise ratio determining method for a receiving end of an information transmission system, the signal-to-noise ratio determining method being based on an information transmission system in which timing synchronization is achieved by using a structure of a repetitive training sequence, the signal-to-noise ratio determining method comprising:
    acquiring a peak and a valley of an autocorrelation function, wherein the peak represents a sum of a signal average power and a noise average power, and the valley represents the noise average power; and
    determining a signal-to-noise ratio based on the peak and the valley.

2. The signal-to-noise ratio determining method according to claim 1, wherein the acquiring a peak and a valley of an autocorrelation function comprises:
    determining an autocorrelation function $R_{auto}(k+N)$ which is expressed as $$R_{auto}(k+N) = \frac{1}{N}\sum_{m=0}^{N-1} r(k+m)r(k+m+N)^*,$$

wherein k represents a subscript related to time, N represents a length of the repetitive training sequence, r(k+m) represents a signal at a time instant delayed than a time instant k by m sampling periods, m represents the number of delayed sampling periods, and (.)* represents a conjugate operation;
    determining a peak $R_{auto}^\Delta(N)$ of the autocorrelation function from the autocorrelation function $R_{auto}(k+N)$, wherein in a case that there is no frequency offset in the information transmission system, the peak $R_{auto}^\Delta(N)$ is determined as $$R_{auto}^\Delta(N) = \frac{1}{N}\sum_{m=0}^{N-1} [s_{preamble}(k_\Delta + m) + w(k_\Delta + m)]$$
$$[s_{preamble}(k_\Delta + m + N) + w(k_\Delta + m + N)]^*$$
$$= P_{signal} + P_{noise},$$

and in a case that there is a frequency offset which is expressed as $\varepsilon = f_{offset}/\Delta f$ in the information transmission system, the peak $R_{auto}^\Delta(N)$ is determined as $$R_{auto}^\Delta(N) = \frac{1}{N}\sum_{m=0}^{N-1} [s_{preamble}(k_\Delta + m) + w(k_\Delta + m)]$$
$$[s_{preamble}(k_\Delta + m + N) + w(k_\Delta + m + N)]^*,$$
$$= P_{signal} e^{j2\pi k\varepsilon/N} + P_{noise}$$

wherein $f_{offset}$ represents a carrier offset, and $\Delta f$ represents a subcarrier frequency interval; and
    determining a valley $R_{auto}^\nabla(N)$ of the autocorrelation function from the autocorrelation function $R_{auto}(k+N)$, wherein the valley $R_{auto}^\nabla(N)$ is determined as $$R_{auto}^\nabla(N) = \frac{1}{N}\sum_{m=0}^{N-1} w(k_\nabla + m)[s_{preamble}(k_\nabla + m) + w(k_\nabla + m + N)]^*,$$
$$= P_{noise}$$

wherein $s_{preamble}(k)$ represents a training sequence, w(k) represents a noise, $P_{signal}$ represents a signal average power, $P_{noise}$ represents a noise average power, $k_\Delta$ represents a time subscript corresponding to the peak, and $k_\nabla$ represents a time subscript corresponding to the valley.

3. The signal-to-noise ratio determining method according to claim 2, wherein the determining a signal-to-noise ratio based on the peak and the valley comprises:
    determining a signal-to-noise ratio SNR based on the peak $R_{auto}^\Delta(N)$ and the valley $R_{auto}^\nabla(N)$ according to a signal-to-noise ratio determination rule which is expressed as $$SNR = \frac{|R_{auto}^\Delta(N)| - |R_{auto}^\nabla(N)|}{|R_{auto}^\nabla(N)|},$$

wherein |·| represents an absolute value operation.

4. A channel equalization method based on a minimum mean square error (MMSE) equalizer, the channel equalization method comprising:
    acquiring the signal-to-noise ratio determined by performing the signal-to-noise ratio determining method according to claim 1, and acquiring a frequency domain channel impulse response;

determining an MMSE equalizer coefficient based on the signal-to-noise ratio and the frequency domain channel impulse response;
determining a scale correction factor based on an average frequency domain channel response, a signal average power and a noise average power; and
performing an equalizing process on a received frequency domain signal based on the MMSE equalizer coefficient and the scale correction factor, to obtain a scale-corrected frequency domain signal.

5. The channel equalization method according to claim 4, wherein the determining a scale correction factor based on an average frequency domain channel response, a signal average power and a noise average power comprises:
determining a scale correction factor $\Theta$ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

6. A signal-to-noise ratio determining device for a receiving end of an information transmission system, the signal-to-noise ratio determining device being based on an information transmission system in which timing synchronization is achieved by using a structure of a repetitive training sequence, the signal-to-noise ratio determining device comprising:
a first acquiring module configured to acquire a peak and a valley of an autocorrelation function, wherein the peak represents a sum of a signal average power and a noise average power, and the valley represents the noise average power; and
a signal-to-noise ratio determining module configured to determine a signal-to-noise ratio based on the peak and the valley.

7. The signal-to-noise ratio determining device according to claim 6, wherein the first acquiring module comprises:
an autocorrelation function determining unit configured to determine an autocorrelation function $R_{auto}(k+N)$ which is expressed as $$R_{auto}(k+N) = \frac{1}{N} \sum_{m=0}^{N-1} r(k+m) r(k+m+N)^*,$$

wherein k represents a subscript related to time, N represents a length of the repetitive training sequence, r(k+m) represents a signal at a time instant delayed than a time instant k by m sampling periods, m represents the number of delayed sampling periods, and (.)* represents a conjugate operation;
a first peak determining unit configured to determine a peak $R_{auto}^{\Delta}(N)$ of the autocorrelation function from the autocorrelation function $R_{auto}(k+N)$, wherein in a case that there is no frequency offset in the information transmission system, the peak $R_{auto}^{\Delta}(N)$ is determined as $$R_{auto}^{\Delta}(N) = \frac{1}{N} \sum_{m=0}^{N-1} [s_{preamble}(k_{\Delta}+m) + w(k_{\Delta}+m)]$$

-continued
$$[s_{preamble}(k_{\Delta}+m+N) + w(k_{\Delta}+m+N)]^*;$$
$$= P_{signal} + P_{noise}$$

a second peak determining unit configured to determine the peak $R_{auto}^{\Delta}(N)$ of the autocorrelation function from the autocorrelation function $R_{auto}(k+N)$, wherein in a case that there is a frequency offset which is expressed as $\varepsilon = f_{offset}/\Delta f$ in the information transmission system, the peak $R_{auto}^{\Delta}(N)$ is determined as $$R_{auto}^{\Delta}(N) = \frac{1}{N} \sum_{m=0}^{N-1} [s_{preamble}(k_{\Delta}+m) + w(k_{\Delta}+m)]$$
$$[s_{preamble}(k_{\Delta}+m+N) + w(k_{\Delta}+m+N)]^*,$$
$$= P_{signal} e^{j2\pi k \varepsilon/N} + P_{noise}$$

wherein $f_{offset}$ represents a carrier offset, and $\Delta f$ represents a subcarrier frequency interval; and
a valley determining unit configured to determine a valley $R_{auto}^{\nabla}(N)$ of the autocorrelation function from the autocorrelation function $R_{auto}(k+N)$, wherein the valley $R_{auto}^{\nabla}(N)$ is determined as $$R_{auto}^{\nabla}(N) = \frac{1}{N} \sum_{m=0}^{N-1} w(k_{\nabla}+m)[s_{preamble}(k_{\nabla}+m) + w(k_{\nabla}+m+N)]^*,$$
$$= P_{noise}$$

wherein $s_{preamble}(k)$ represents a training sequence, $w(k)$ represents a noise, $P_{signal}$ represents a signal average power, $P_{noise}$ represents a noise average power, $k_{\Delta}$ represents a time subscript corresponding to the peak, and $k_{\nabla}$ represents a time subscript corresponding to the valley.

8. The signal-to-noise ratio determining device according to claim 7, wherein the signal-to-noise ratio determining module is configured to determine a signal-to-noise ratio SNR based on the peak $R_{auto}^{\Delta}(N)$ and the valley $R_{auto}^{\nabla}(N)$ according to a signal-to-noise ratio determination rule which is expressed as $$SNR = \frac{|R_{auto}^{\Delta}(N)| - |R_{auto}^{\nabla}(N)|}{|R_{auto}^{\nabla}(N)|},$$

wherein |•| represents an absolute value operation.

9. A channel equalization device based on a minimum mean square error (MMSE) equalizer, the channel equalization device comprising:
a second acquiring module configured to: acquire the signal-to-noise ratio determined by the signal-to-noise ratio determining device according to claim 6, and acquire a frequency domain channel impulse response;
an equalizer coefficient determining module configured to determine an MMSE equalizer coefficient based on the signal-to-noise ratio and the frequency domain channel impulse response;
a scale correction factor determining module configured to determine a scale correction factor based on an average frequency domain channel response, a signal average power and a noise average power; and a signal equalization module configured to: perform an equalizing process on a received frequency domain signal based on the MMSE equalizer coefficient and the scale correction factor, to obtain a scale-corrected frequency domain signal.

10. The channel equalization device according to claim 9, wherein the scale correction factor determining module is configured to determine a scale correction factor Θ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

11. A channel equalization method based on a minimum mean square error (MMSE) equalizer, the channel equalization method comprising:
acquiring the signal-to-noise ratio determined by performing the signal-to-noise ratio determining method according to claim 2, and acquiring a frequency domain channel impulse response;
determining an MMSE equalizer coefficient based on the signal-to-noise ratio and the frequency domain channel impulse response;
determining a scale correction factor based on an average frequency domain channel response, a signal average power and a noise average power; and
performing an equalizing process on a received frequency domain signal based on the MMSE equalizer coefficient and the scale correction factor, to obtain a scale-corrected frequency domain signal.

12. A channel equalization method based on a minimum mean square error (MMSE) equalizer, the channel equalization method comprising:
acquiring the signal-to-noise ratio determined by performing the signal-to-noise ratio determining method according to claim 3, and acquiring a frequency domain channel impulse response;
determining an MMSE equalizer coefficient based on the signal-to-noise ratio and the frequency domain channel impulse response;
determining a scale correction factor based on an average frequency domain channel response, a signal average power and a noise average power; and
performing an equalizing process on a received frequency domain signal based on the MMSE equalizer coefficient and the scale correction factor, to obtain a scale-corrected frequency domain signal.

13. The channel equalization method according to claim 11, wherein the determining a scale correction factor based on an average frequency domain channel response, a signal average power and a noise average power comprises:
determining a scale correction factor Θ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

14. The channel equalization method according to claim 12, wherein the determining a scale correction factor based on an average frequency domain channel response, a signal average power and a noise average power comprises:
determining a scale correction factor Θ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

15. A channel equalization device based on a minimum mean square error (MMSE) equalizer, the channel equalization device comprising:
a second acquiring module configured to: acquire the signal-to-noise ratio determined by the signal-to-noise ratio determining device according to claim 7, and acquire a frequency domain channel impulse response;
an equalizer coefficient determining module configured to determine an MMSE equalizer coefficient based on the signal-to-noise ratio and the frequency domain channel impulse response;
a scale correction factor determining module configured to determine a scale correction factor based on an average frequency domain channel response, a signal average power and a noise average power; and
a signal equalization module configured to: perform an equalizing process on a received frequency domain signal based on the MMSE equalizer coefficient and the scale correction factor, to obtain a scale-corrected frequency domain signal.

16. A channel equalization device based on a minimum mean square error (MMSE) equalizer, the channel equalization device comprising:
a second acquiring module configured to: acquire the signal-to-noise ratio determined by the signal-to-noise ratio determining device according to claim 8, and acquire a frequency domain channel impulse response;
an equalizer coefficient determining module configured to determine an MMSE equalizer coefficient based on the signal-to-noise ratio and the frequency domain channel impulse response;
a scale correction factor determining module configured to determine a scale correction factor based on an average frequency domain channel response, a signal average power and a noise average power; and
a signal equalization module configured to: perform an equalizing process on a received frequency domain signal based on the MMSE equalizer coefficient and the scale correction factor, to obtain a scale-corrected frequency domain signal.

17. The channel equalization device according to claim 15, wherein the scale correction factor determining module is configured to determine a scale correction factor Θ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

18. The channel equalization device according to claim 16, wherein the scale correction factor determining module is configured to determine a scale correction factor $\Theta$ based on an average frequency domain channel response $\overline{H}$, a signal average power $P_{signal}$, and a noise average power $P_{noise}$ according to a scale correction factor determination rule which is expressed as $$\Theta = \frac{|\overline{H}|^2 P_{signal} + P_{noise}}{|\overline{H}|^2 P_{signal}}.$$

* * * * *